United States Patent
Lawrence et al.

(10) Patent No.: US 10,424,299 B2
(45) Date of Patent: Sep. 24, 2019

(54) VOICE COMMAND MASKING SYSTEMS AND METHODS

(71) Applicant: INTEL CORPORATION, Santa Clara, CA (US)

(72) Inventors: Sean J. W. Lawrence, Bangalore (IN); Devon Worrell, Folsom, CA (US); Michael E. Deisher, North Plains, OR (US)

(73) Assignee: INTEL CORPORATION, Santa Clara, CA (US)

( * ) Notice: Subject to any disclaimer, the term of this patent is extended or adjusted under 35 U.S.C. 154(b) by 28 days.

(21) Appl. No.: 15/720,446

(22) Filed: Sep. 29, 2017

(65) Prior Publication Data

US 2019/0103098 A1     Apr. 4, 2019

(51) Int. Cl.
| | | |
|---|---|---|
| *G10L 15/20* | (2006.01) | |
| *G10L 15/22* | (2006.01) | |
| *G06F 3/00* | (2006.01) | |
| *G10K 11/175* | (2006.01) | |
| *G06F 3/16* | (2006.01) | |
| *G10L 15/08* | (2006.01) | |
| *G10L 21/003* | (2013.01) | |

(Continued)

(52) U.S. Cl.
CPC .............. *G10L 15/22* (2013.01); *G06F 3/167* (2013.01); *G10K 11/175* (2013.01); *G10L 15/08* (2013.01); *G10L 15/20* (2013.01); *G10L 21/003* (2013.01); *H04K 1/00* (2013.01); *G10L 2015/088* (2013.01); *G10L 2015/223* (2013.01); *G10L 2021/02087* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,165,570 A | * | 8/1979 | Crancer, Jr. ............ | G09B 19/00 434/305 |
| 6,212,408 B1 | * | 4/2001 | Son ........................ | H04M 1/271 379/355.01 |

(Continued)

FOREIGN PATENT DOCUMENTS

WO      0072563 A1     11/2000

*Primary Examiner* — Shreyans A Patel
(74) *Attorney, Agent, or Firm* — Finch & Maloney PLLC

(57) ABSTRACT

Techniques are disclosed for reliably masking speech commands directed to one or more computing devices to prevent the speech commands from being rendered. In some embodiments, each of the one or more computing devices includes components configured to generate acoustic data from ambient sound waves, process the acoustic data to identify a speech command sequence, and mask the speech command sequence from being rendered. At least some of the systems and methods disclosed herein monitor inbound audio at a fine grain level of detail. Working at this level of granularity enables the system and methods described herein to detect potential speech commands early within the user's utterance thereof and to discriminate quickly between true speech commands and other user utterances. These early detection and discrimination features, in turn, enable some embodiments to manage potential communication disruptions (e.g., jitter and/or latency) by modifying rates of audio prior to rendering.

20 Claims, 7 Drawing Sheets

(51) Int. Cl.
*H04K 1/00* (2006.01)
*G10L 21/0208* (2013.01)

(56) References Cited

U.S. PATENT DOCUMENTS

| | | | |
|---|---|---|---|
| 6,324,514 B2 * | 11/2001 | Matulich | H05B 37/0236 704/275 |
| 2014/0142951 A1 * | 5/2014 | Crawley | G10L 15/22 704/275 |
| 2015/0039319 A1 * | 2/2015 | Mei | G10L 15/1822 704/275 |
| 2016/0012820 A1 * | 1/2016 | Mun | G10L 15/32 704/251 |
| 2016/0267913 A1 * | 9/2016 | Kim | G10L 15/22 |
| 2017/0206902 A1 * | 7/2017 | Parkinson | G10L 15/08 |

* cited by examiner

VOICE COMMAND MASKING SYSTEMS AND METHODS

BACKGROUND

Conventional automatic speech recognition (ASR) processes enable computing devices to identify words present within audio data. As the accuracy of these ASR processes increases, so do the number of computing devices that leverage these processes. For instance, some telecommunications devices (e.g., voice-activated telephones) can identify and act upon any of several commands communicated vocally by users. Examples of these commands may include dialing commands, volume commands, call answering commands, and call ending commands. Vocally controlled telecommunications devices can be especially helpful to disabled persons who may have difficulty accessing or using conventional telephone interfaces.

However, the utility of vocally controlled telecommunications can be hampered due to the auditory nature of the control interface. For example, in some situations, a user of a vocally controlled telecommunications device may wish to communicate a command during an active telecommunications conference. In these situations, users located remotely from the user may hear the user's commands and misinterpret the commands as communications directed to them. This misinterpretation may result in confusion, thereby hampering the flow and effectiveness of the telecommunications conference.

DETAILED DESCRIPTION

Figure 1:
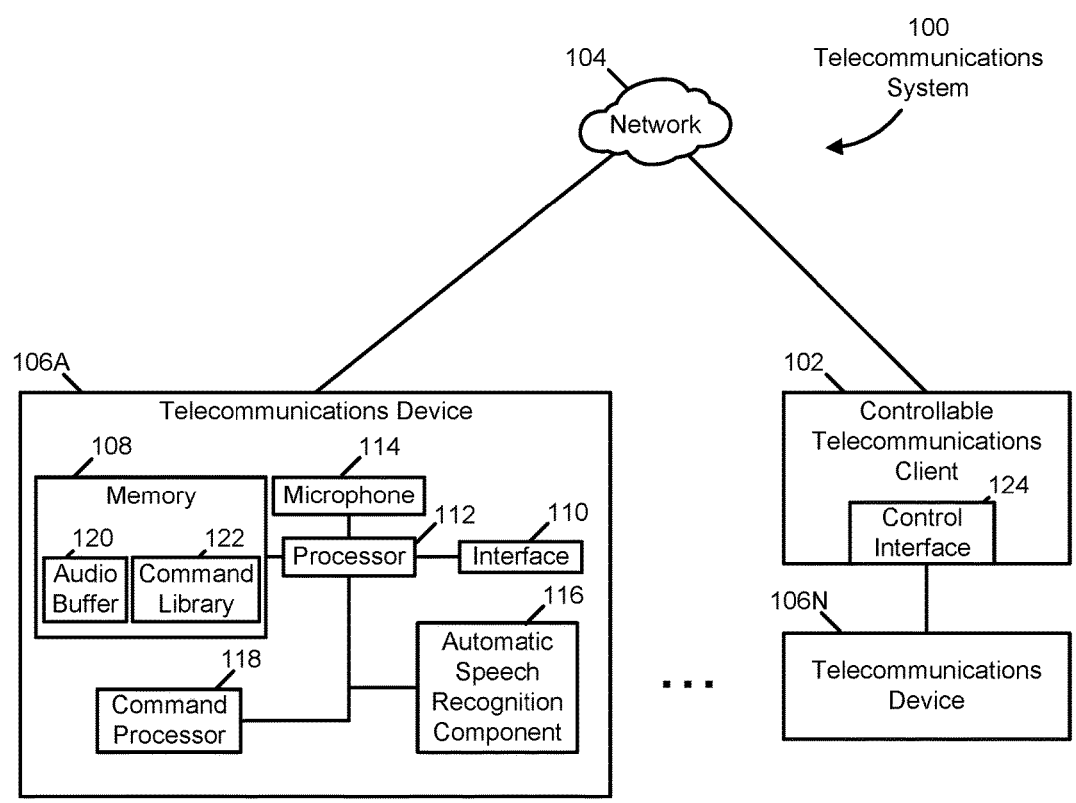
FIG. 1 is a block diagram illustrating a telecommunications system configured in accordance with an embodiment of the present disclosure.

The systems and methods disclosed herein reliably mask speech commands directed to one or more telecommunications devices to prevent these speech commands from being rendered via other telecommunications devices to remote participants in a teleconference. In some embodiments, each of the one or more telecommunications devices includes components configured to generate acoustic data from ambient sound waves, process the acoustic data to identify a speech command sequence, and mask the speech command sequence from remote telecommunications devices connected to the telecommunications device in the teleconference. As will be apparent in view of this disclosure, some of the systems and methods disclosed herein monitor inbound audio at a fine grain level of detail. Working at this level of granularity enables the system and methods described herein to detect potential speech commands early within the user's utterance thereof and to discriminate quickly between true speech commands and other user utterances. These early detection and discrimination features, in turn, enable some embodiments to manage potential communication disruptions (e.g., jitter and/or latency) by modifying rates of audio prior to transmission of the audio to remote telecommunications devices.

In some embodiments, to generate acoustic data, each of the telecommunications devices includes a microphone and circuitry (e.g., an analogue to digital converter and/or digital signal processor) to convert analogue electrical signals acquired from acoustic signals received by the microphone to digital acoustic data. To process this acoustic data in some embodiments, each of the telecommunications devices includes a speech command processor that is configured to interoperate with an ASR component to identify speech command sequences present within the acoustic data.

These speech command sequences may include elements such as speech command delimiters, speech commands, and/or speech command parameters. In some embodiments, speech command delimiters represent basic human language constructs (e.g., words or phrases) that indicate a subsequent human language construct is a speech command. For example, one telecommunication device may be configured to identify a speech command delimiter such as "attention telephone." Upon identification of the "attention telephone" phrase within the acoustic data, this telecommunication device may execute subsequent speech command and masking actions with a lower probability of needing to abort these actions, as described further below.

In some embodiments, speech command parameters are required or optional data used to execute a speech command. For example, the speech command "dial" may be followed by a parameter specifying the number to be called. Not all speech commands require a parameter. For example, the speech command "hang up" requires no additional information to be properly executed.

In some embodiments, the ASR component and the speech command processor are configured to interoperate to identify speech command sequences as follows. The ASR component scans the acoustic data to identify one or more basic constructs of human language within the acoustic data, and the speech command processor maps the identified basic constructs to elements of speech command sequences. These basic constructs may include phonemes, words, phrases, and the like. For example, in one embodiment where the identified basic constructs include phonemes, the speech command processor is configured to match one or more identified phonemes with one or more elements of a speech command sequence by finding the one or more identified phonemes within a cross-reference that associates the one or more identified phonemes with an element of a speech command sequence. In some embodiments, to increase execution efficiency the speech command processor may limit the volume of basic constructs scanned for by the ASR component. For example, the speech command processor may modify a configuration file specifying the basic constructs for which the ASR component scans.

In some embodiments, to mask the speech command sequence from remote telecommunications devices connected to the telecommunications device, the speech command processor is configured to execute a redaction process against acoustic data including the speech command sequence. This redaction process may delete or overwrite (e.g., with noise, tones, or silence) the speech command sequence within the acoustic data.

In some instances, the speech command processor may incorrectly identify one or more basic constructs (e.g., phonemes) as being initial basic constructs of a speech command sequence, but later determine that these one or more basic constructs are not part of a speech command sequence. In these instances, the speech command processor initially buffers the one or more basic constructs to prevent their unredacted transmission, but later determines that their unredacted transmission is appropriate. To enable proper handling of these instances, in some embodiments the speech command processor is configured to execute a rate modification process that, for example, down samples the acoustic data prior to its transmission to decrease the span of time required to render it. This rate modification process may modify the acoustic data including the basic constructs and/or additional acoustic data.

Other embodiments are directed to audio processing devices that reliably mask speech commands to prevent the speech commands from being stored within audio data. In these embodiments, the audio processing device includes components configured to generate acoustic data from ambient sound waves, process the acoustic data to identify a speech command sequence, and mask the speech command sequence prior to storing audio data based on the acoustic data. As will be apparent in view of this disclosure, some of the systems and methods disclosed herein monitor inbound audio at a fine grain level of detail. Working at this level of granularity enables the system and methods described herein to detect potential speech commands early within the user's utterance thereof and to discriminate quickly between true speech commands and other user utterances. These early detection and discrimination features, in turn, enable some embodiments to manage potential communication disruptions (e.g., jitter and/or latency) by modifying rates of audio prior to, or after, storage thereof.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. References to "an embodiment," "other embodiments," "an example," "some embodiments," "some examples," "an alternate embodiment," "various embodiments," "one embodiment," "at least one embodiment," "another embodiment," "this and other embodiments" or the like are not necessarily mutually exclusive and are intended to indicate that a particular feature, structure, or characteristic described in connection with the embodiment or example may be included in at least one embodiment or example. The appearances of such terms herein are not necessarily all referring to the same embodiment or example. Any embodiment or example disclosed herein may be combined with any other embodiment or example.

Also, the phraseology and terminology used herein is for the purpose of description and should not be regarded as limiting. Any references to examples, embodiments, components, elements, or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

General Overview

During teleconferences, speech command sequences uttered to control a local telecommunications device are intended as local input to the device and are not intended for remote consumption. However, conventional telecommunications systems transmit ambient sounds regardless of the content of the sound. Remote participants may be confused by speech command sequences when they are rendered remotely.

Thus, and in accordance with at least some embodiments disclosed herein, a telecommunications system separates speech command sequences from audio that is intended from remote consumption. In these embodiments, the telecommunications system acquires acoustic signals representative of ambient sound, buffers acoustic data corresponding to the acquired acoustic signals, identifies speech command sequences within the acoustic data, and masks the speech command sequences when transmitting the acoustic data to other telecommunication devices.

System Architecture

FIG. 1 illustrates a telecommunications system 100 including a plurality of telecommunications devices 106A through 106N, a controllable telecommunications client 102, and a telecommunications network 104. As shown in FIG. 1, each of telecommunications devices 106A through 106N is configured to receive, process, and mask one or more speech command sequences that control its operation. The commands included in these speech control sequences may include dialing commands, volume commands, call transferring commands, call answering commands, microphone muting commands, and call ending commands. In support of this functionality, each of the telecommunications devices 106A through 106N includes a command processor 118, an ASR component 116, a microphone 114, memory 108, at least one interface 110, and at least one processor 112. Each of these components and their interoperation is described further below.

As illustrated in FIG. 1, the memory 108 may incorporate volatile and/or non-volatile data storage (e.g., read-only memory, random access memory, flash memory, magnetic/optical disk, and/or some other computer readable and writable medium) that is readable and/or writable by the at least one processor 112. The memory 108 is sized and configured to store programs executable by the at least one processor 112 and at least some of the data used by the programs during execution. For example, the memory 108 includes an audio buffer 120 sized and configured to store acoustic data acquired and processed by the telecommunications device 106A. The memory 108 also stores a command library 122 that includes data descriptive of speech commands supported by the telecommunications device 106A.

As shown in FIG. 1, the at least one processor 112 includes various computing circuitry, such as an arithmetic-logic unit and register memory, that can execute instructions defined by an instruction set supported by the at least one processor 112. The at least one processor 112 may include a single core processor, a multi-core processor, a microcontroller, digital signal processor, or some other data processing device (such as a field programmable gate array, application specific integrated circuit, or some other hardware-implemented dedicated logic device). The at least one interface 110 includes communications hardware and circuitry, such as a wired or wireless Ethernet port, RJ 45 port, etc., that is controllable by the at least one processor 112 and that enables the at least one processor 112 to communicate with other devices in the telecommunications system 100.

As shown in FIG. 1, the microphone 114 includes any acoustic transducer configured to acquire acoustic signals from the environment of the telecommunications device in which it is housed. In some embodiments, these acoustic signals are digitized by the at least one processor 112 to produce acoustic data. This acoustic data may be stored in the audio buffer 120 for subsequent processing and/or transmission via the at least one interface 110 to another telecommunications device connected to the telecommunications network 104.

In some embodiments, the ASR component 116 is a software and/or hardware component that is executable and controllable by the at least one processor 112. In these embodiments, the ASR component 116 is configured to process acoustic data (e.g., the acoustic data stored in the audio buffer 120) to identify human language phonemes, words, phrases, and other human language constructs. In some embodiments, the ASR component 116 is configured to search the acoustic data for specific basic constructs that are parts of speech command sequences supported by the telecommunications device 106A. These specific basic constructs may be specified by a configuration file stored in the memory 108. Additionally or alternatively, these specific basic constructs may be specified by the command processor 118 via communications it transmits to the ASR component 116 via an application program interface.

As illustrated in FIG. 1, the command processor 118 is a software and/or hardware component that is executable and controllable by the at least one processor 112. In some embodiments, the command processor 118 is configured to process speech commands. Additionally, in at least one embodiment, the command processor 118 is configured to interoperate with the ASR component 116 to identify and mask speech commands prior to transmission of acoustic data including the speech commands to another telecommunications device connected to the telecommunications network 104. One example of a command execution and masking process executed by the command processor 118 in some embodiments is described further below with reference to FIG. 2.

As shown in FIG. 1, the telecommunications device 106A is configured to operate as an independent device that can communicate with the controllable telecommunications client 102 and other telecommunications devices connected to the telecommunications network 104. Also as shown in FIG. 1, the telecommunications device 106N is configured to operate as a collaborative device that can control the controllable telecommunications client 102 via the control interface 124.

As illustrated in FIG. 1, the telecommunications network 104 may include any communication network through which telecommunication devices can exchange information. For example, the telecommunications network 104 may be any public network, such as the a PSTN and/or the Internet. The telecommunications network 104 may also include cellular networks, such as LTE, 4G, 5G, HSDPA/HSUPA, TD-SCDMA, W-CDMA, CDMA, WIFI, Bluetooth, EvDo, GSM, and iDEN networks. The controllable telecommunications client 102 may include any device configured to communicate with other devices on the telecommunications network 104, such as cellular telephones, wire telephones, laptop computers executing telecommunications client software, and the like. As shown in FIG. 1, the controllable telecommunications client 102 includes a control interface 124 that is configured to process commands received from the telecommunications device 106N.

Figure 4A:
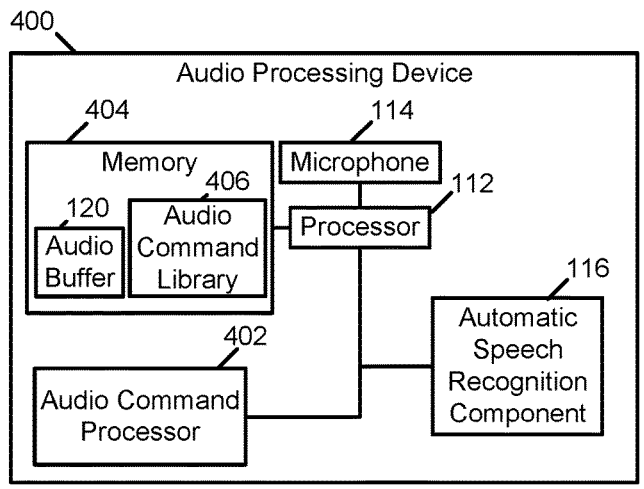
FIG. 4A is a block diagram illustrating an audio processing device configured in accordance with an embodiment of the present disclosure.

Some embodiments are directed to personal communication devices such as smart phones, transcription devices, and translation devices that may be sporadically connected to, or not connected to, a telecommunications network. FIG. 4A illustrates one such embodiment, an audio processing device 400. In some embodiments, the audio processing device 400 is configured to receive, process, and mask one or more speech command sequences that control its operation. The commands included in these speech control sequences may include text entry commands, text editing commands, output processing commands, and the like. In support of this functionality, the audio processing device 400 includes several components illustrated in FIG. 4A. These components include an audio command processor 402 and a memory 404. The memory 404 includes an audio command library 406. Additionally, the support components include components described above with reference to FIG. 1. These previously described components include the microphone 114, the processor 112, the ASR component 116, and the audio buffer 120.

As illustrated in FIG. 4A, the memory 404 may incorporate volatile and/or non-volatile data storage (e.g., read-only memory, random access memory, flash memory, magnetic/optical disk, and/or some other computer readable and writable medium) that is readable and/or writable by the at least one processor 112. The memory 404 is sized and configured to store programs executable by the at least one processor 112 and at least some of the data used by the programs during execution. For example, the memory 404 includes an audio buffer 120 sized and configured to store acoustic data acquired and processed by the audio processing device 400. The memory 108 also stores an audio command library 406 that includes data descriptive of speech commands supported by the audio processing device 400.

As illustrated in FIG. 4A, the audio command processor 402 is a software and/or hardware component that is executable and controllable by the at least one processor 112. In some embodiments, the audio command processor 402 is configured to process speech commands. Additionally, in at least one embodiment, the audio command processor 402 is configured to interoperate with the ASR component 116 to identify and mask speech commands prior to storage of acoustic data including the speech commands. One example of a command execution and masking process executed by the audio command processor 402 in some embodiments is described further below with reference to FIG. 5.

The examples disclosed herein are not limited to the arrangement of components illustrated in FIGS. 1 and 4A. For instance, some examples combine the audio command processor 402 with the ASR component 116. Other examples segment portions of the audio command processor 402 and/or the ASR component 116 into a plurality of hardware and/or software components. Still other examples implement a split architecture in which the microphone 114 is housed within a physical device that is separate from (but connectable to) the processor 112 and/or the other components illustrated in FIG. 4A. One such example is illustrated in FIG. 4B.

Figure 4B:
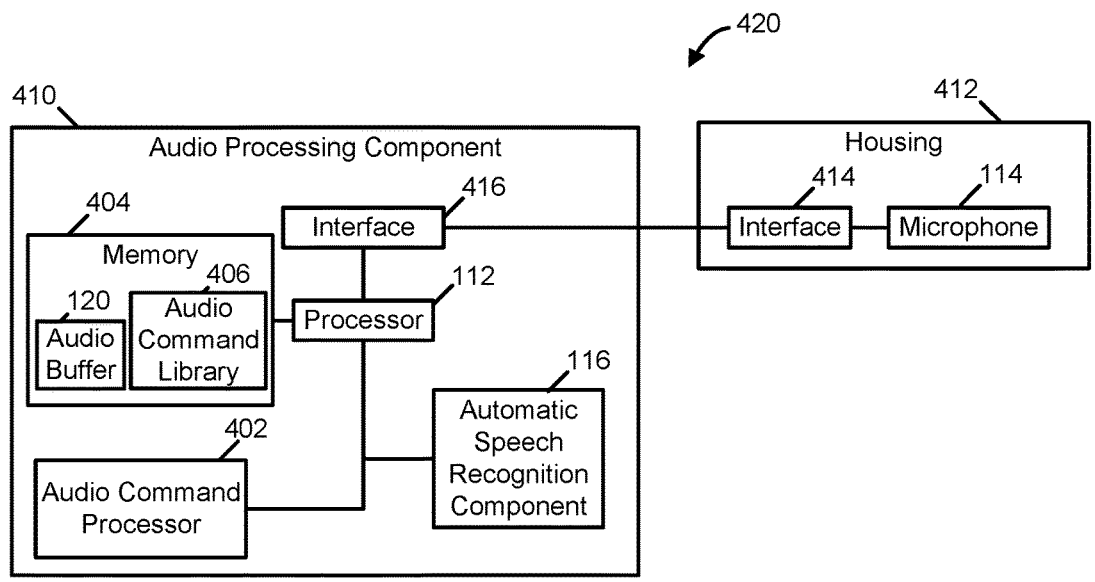
FIG. 4B is a block diagram illustrating another audio processing device configured in accordance with an embodiment of the present disclosure.

FIG. 4B illustrates an audio processing device 420 implemented in a split architecture including an audio processing component 410 and a housing 412. The audio processing component 410 includes the memory 404, the audio command processor 402, the processor 112, and the ASR component 116. The memory 404 includes the audio buffer 120 and the audio command library 406. The audio processing component 410 also includes an interface 416.

As shown in FIG. 4B, the housing 412 includes the microphone 114 and an interface 414. The interface 414 is configured to receive audio from the microphone 114, store the audio, and forward the audio to the interface 416. The interface 416 is configured to receive the audio from the interface 414 and provide the audio to the processor 112 for subsequent command execution and masking. The interfaces 414 and 416 may incorporate volatile and/or non-volatile memory. Additionally, the interfaces 414 and 416 may transmit and receive audio via wired or wireless connections. For instance, in one example, the interface 414 includes a universal serial bus interface configured to electrically couple the microphone 114 to the interface 416, which is in turn coupled to the processor 112. These and other variations fall within the scope of this disclosure.

Methodology

Figure 2:
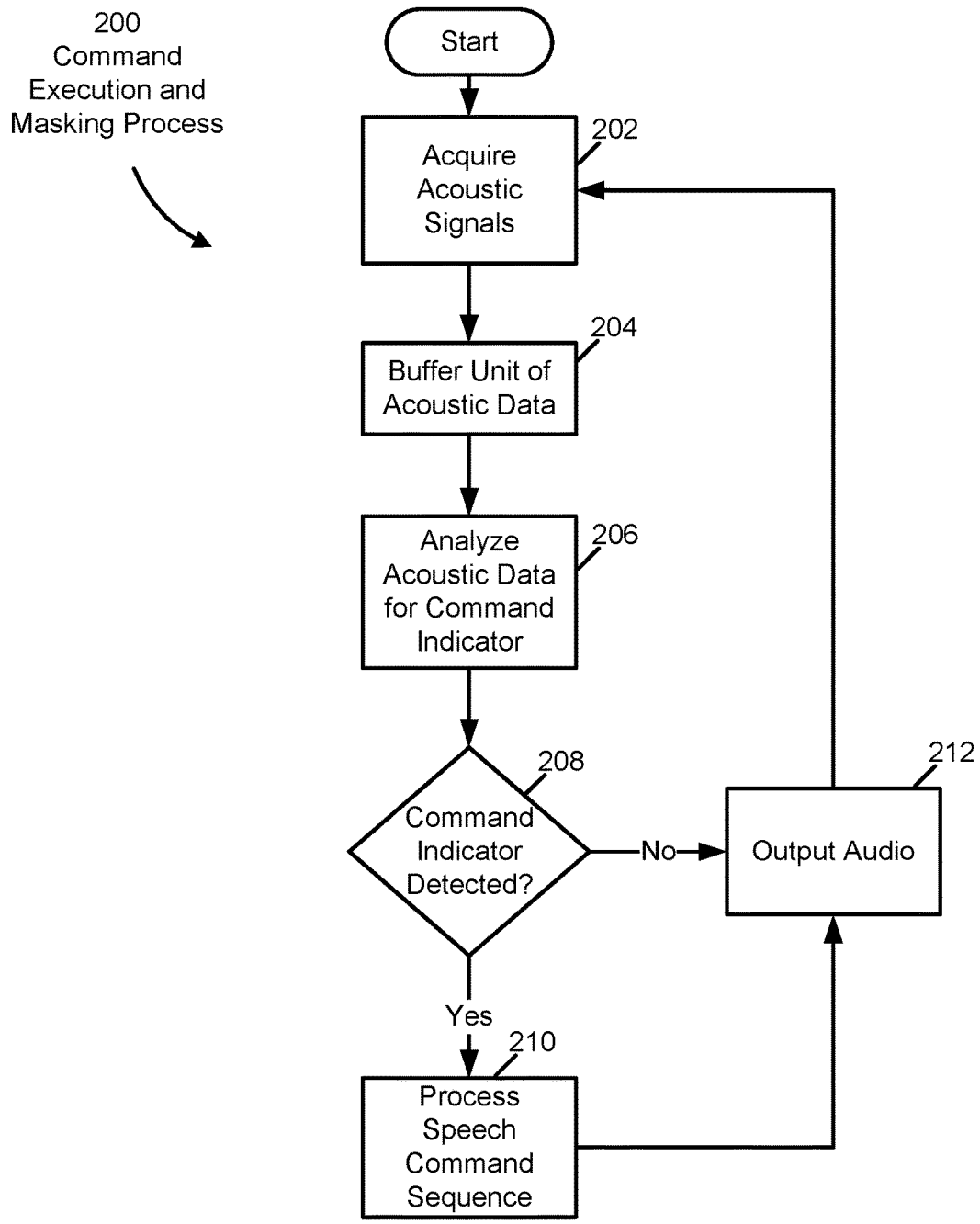
FIG. 2 is a flow diagram illustrating a command sequence masking and execution process in accordance with an embodiment of the present disclosure.

Some embodiments disclosed herein execute a command execution and masking process, such as the command execution and masking 200 illustrated in FIG. 2. The command execution and masking process 200 may be executed by a telecommunications device, such as any of the telecommunications devices 106A through 106N described above with reference to FIG. 1. The acts executed by the command execution and masking process 200 collectively enable a telecommunications device to receive, process, and execute speech command sequences without transmitting an unmodified version of the speech command sequence to remote telecommunications devices.

As illustrated in FIG. 2, the command execution and masking process 200 starts in act 202 with a microphone (e.g., the microphone 114) acquiring acoustic signals from the environment of the telecommunications device. These acoustic signals may be representative of ambient sound that includes human speech. This human speech may include both speech command sequences directed to the telecommunications device and verbal communications directed to local and/or remote participants in a teleconference. Also, within the act 202, a processor (e.g., the at least one processor 112) generates acoustic data from the acquired acoustic signals.

In act 204, a command processor (e.g., the command processor 118) buffers an analyzable duration of the acoustic data in an audio buffer (e.g., the audio buffer 120). In some embodiments, this analyzable duration is the maximum duration of a phoneme in slow but continuous speech (e.g., 500 ms). During its execution within the act 206, the command processor executes an ASR component (e.g., the ASR component 116). The ASR component analyzes the buffered acoustic data to determine whether the buffered acoustic data includes any basic constructs (e.g., phonemes, words, phrases, etc.) of a supported speech command sequence. Such basic constructs are referred to herein as command indicators. In some embodiments, command indicators include one or more initial phonemes of a supported speech command or command delimiter. Command delimiters are human language constructs used to signal to the command processor that the human language construct following the command delimiter is a supported speech command. At the conclusion of this analysis for a command indicator, the ASR component returns its results to the command processor.

In act 208, the command processor determines whether the ASR component identified a command indicator within the acoustic data. If so, the command processor executes at 210. Otherwise, the command processor executes act 212.

Figure 3:
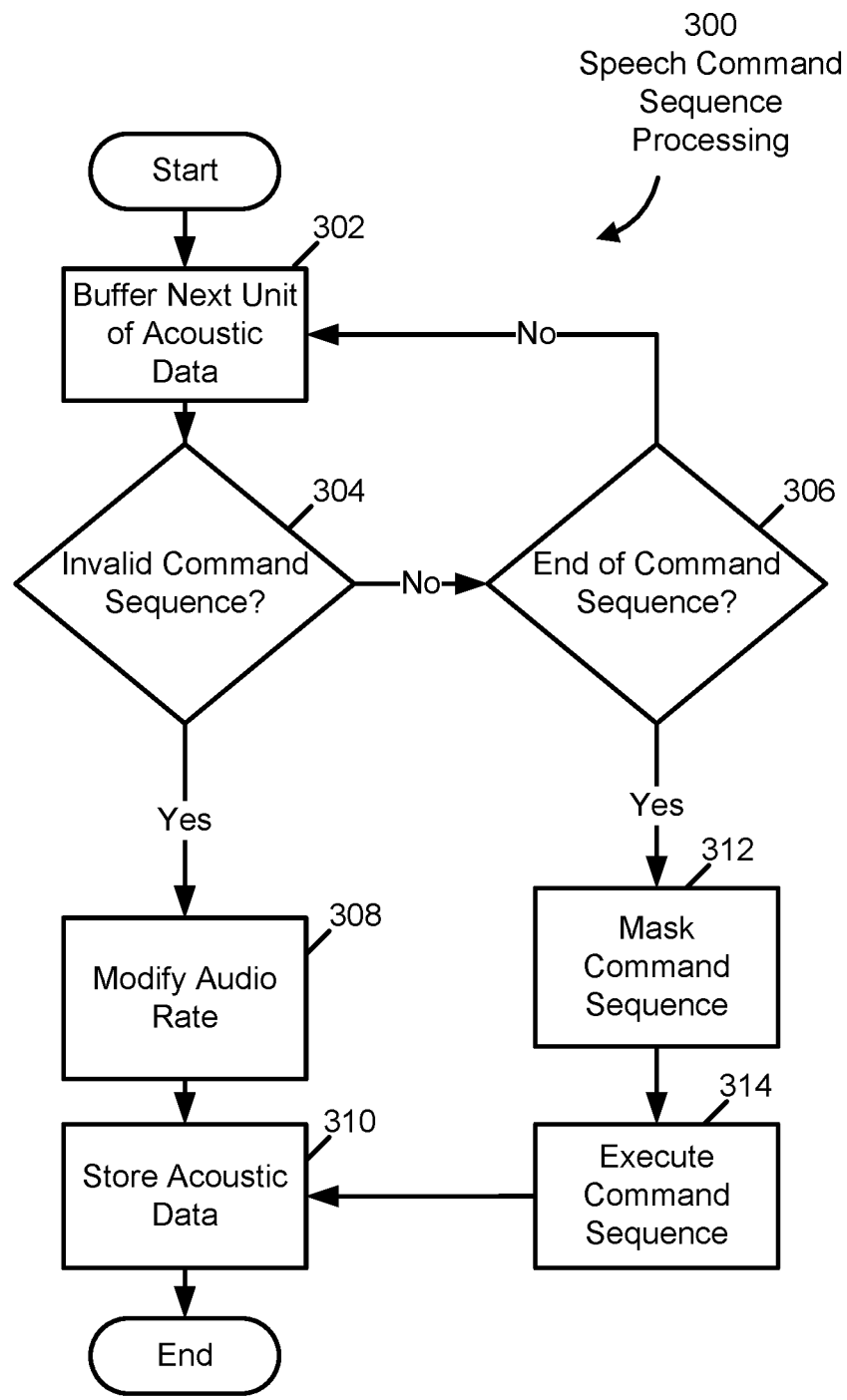
FIG. 3 is a flow chart illustrating a command validation process in accordance with an embodiment of the present disclosure.

In the act 210, the command processor executes speech command sequence processing as illustrated by a process 300 illustrated in FIG. 3. As shown in FIG. 3, the process 300 starts in act 302 with the command processor buffering the next analyzable duration of the acoustic data into the audio buffer. In some embodiments, the act 302 may concatenate acoustic data previously stored in the audio buffer with this next analyzable duration of acoustic data, thus creating a concatenation. By buffering and analyzing small increments of acoustic data, some embodiments in illustrated in FIG. 3 minimize latency between a user's utterance and subsequent processing. This approach may be especially helpful where the command processor cannot validate that the command indicator identified in the act 204 is part of a valid speech command sequence within act 304.

In other embodiments, within the act 302, the amount of acoustic data that the command processor stores in the audio buffer is dependent upon the size and number of basic constructs (e.g., phonemes) needed to validate a command sequence implied by the particular command indicator detected in the act 208. For example, in these embodiments, where the command indicator is one or more initial phonemes of a command delimiter, the command processor stores sufficient acoustic data to be able to positively identify the command delimiter, any of the supported speech commands, and any parameters of the supported speech commands. Where the command indicator is one or more initial phonemes of a support speech command, the command processor stores sufficient acoustic data to be able to positively identify any supported speech command that begins with the one or more initial phonemes and any parameters of those supported speech commands. Optimizing the amount of data buffered in this manner may improve performance in some embodiments.

In act 304, the command processor determines whether the acoustic data stored in the audio buffer includes a sequence of basic constructs that is not part of a valid and supported speech command sequence. If the acoustic data stored in the audio buffer is not part of a valid and supported speech command sequence, the command processor executes act 308. If the acoustic data stored in the audio buffer is part of a valid and supported speech command sequence, the command processor executes act 306.

In act 306, the command processor determines whether the acoustic data buffered in the audio buffer includes an executable speech command sequence. Elements of an executable speech command sequence may include a command delimiter, a speech command, and/or one or more command parameters that are supported by a speech command library (e.g., the command library 122). In some embodiments, to determine whether the acoustic data stored in the audio buffer includes an executable speech command sequence, the command processor evaluates elements of a speech command sequence stored in the audio buffer to the command library. This evaluation may include scanning a cross-reference that associates basic constructs (e.g., phonemes) with elements of speech command sequences supported by the command library in an attempt to positively identify one or more basic constructs within the acoustic data. The command processor may assemble the positively identified elements into a candidate speech command sequence. The evaluation may also include checking the syntax of the candidate speech command sequence to ensure the speech command sequence is formed in accordance with the command library. If the command processor confirms the existence of an executable command sequence within the audio buffer, the command processor executes act 312. Otherwise, the command processor returns to act the 302 to buffer additional acoustic data.

In the act 312, the command processor executes a redaction process that deletes the acoustic data including the executable command sequence or replaces this acoustic data with filler, such as silence, white noise, a tone, music, or other sounds. This redaction process prevents the executable speech command sequence from being detected during playback of the acoustic data.

In act 314, the command processor executes the supported speech command sequence. Execution of the supported speech command sequence may include altering configuration information that specifies operation of the telecommunications device and/or altering configuration information that specifics operation of a collaborative device (e.g., the controllable telecommunications client 102) via a control interface (e.g., the control interface 124).

In the act 308, the command processor executes a rate modification process that modifies the acoustic data stored in the audio buffer to decrease its playback duration without altering its pitch. In some embodiments, the rate modification process resamples and/or down samples the acoustic data. In at least one example, the rate modification process uses a time-scale modification approach. In act 310, the command processor stores the modified acoustic data or stores masked acoustic data in the audio buffer and terminates the command sequence validation process 300.

Returning FIG. 2, in the act 212, the command processor outputs audio based on the acoustic data stored in the audio buffer and returns to the act 202 to acquire and process additional acoustic signals.

Figure 5:
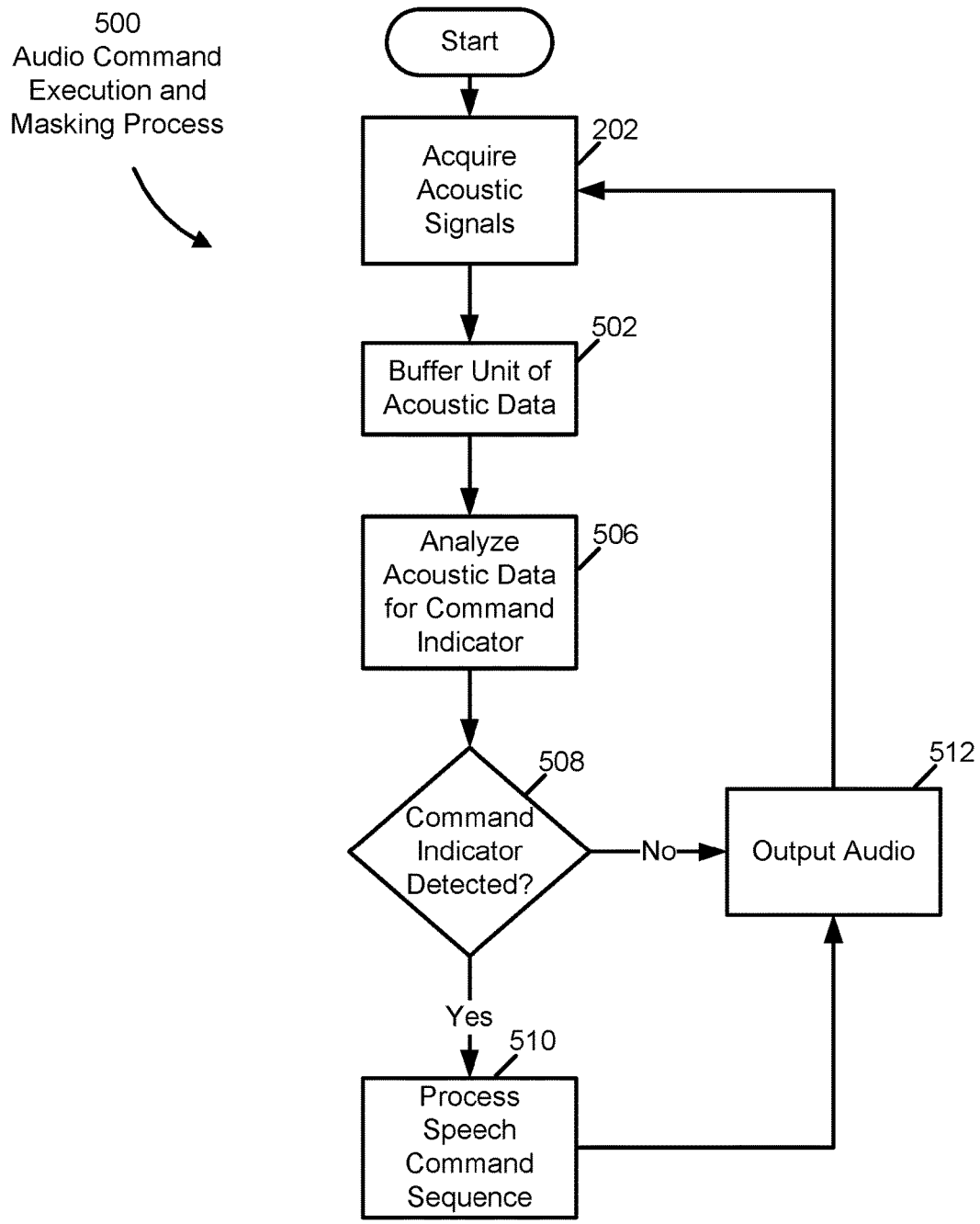
FIG. 5 is a flow diagram illustrating an audio command sequence masking and execution process in accordance with an embodiment of the present disclosure.

Some embodiments disclosed herein execute an audio command execution and masking process, such as the audio command execution and masking 500 illustrated in FIG. 5. The audio command execution and masking process 500 may be executed by an audio processing device, such as the audio processing devices 400 described above with reference to FIG. 4A. The acts executed by the audio command execution and masking process 500 collectively enable an audio processing device to receive, process, and execute speech command sequences without storing an unmodified version of the speech command sequence within other recorded audio.

As illustrated in FIG. 5, the audio command execution and masking process 500 starts with the act 202 described above with reference to FIG. 2. Next, in act 502, an audio command processor (e.g., the audio command processor 402) buffers an analyzable duration of the acoustic data in an audio buffer (e.g., the audio buffer 120). In some embodiments, this analyzable duration is the maximum duration of a phoneme in slow but continuous speech (e.g., 500 ms). During its execution within the act 506, the audio command processor executes an ASR component (e.g., the ASR component 116). The ASR component analyzes the buffered acoustic data to determine whether the buffered acoustic data includes any basic constructs (e.g., phonemes, words, phrases, etc.) of a supported speech command sequence. Such basic constructs are referred to herein as command indicators. In some embodiments, command indicators include one or more initial phonemes of a supported speech command or command delimiter. Command delimiters are human language constructs used to signal to the audio command processor that the human language construct following the command delimiter is a supported speech command. At the conclusion of this analysis for a command indicator, the ASR component returns its results to the audio command processor.

In act 508, the audio command processor determines whether the ASR component identified a command indicator within the acoustic data. If so, the audio command processor executes at 510. Otherwise, the audio command processor executes act 512.

In the act 510, the audio command processor executes speech command sequence processing as illustrated by the process 300 illustrated in FIG. 3. In so doing, the audio command processor takes the place of the command processor described above with reference to FIG. 3 and the audio command library takes the place of the command library described above with reference to FIG. 3. In the act 512, the audio command processor outputs audio data based on the acoustic data stored in the audio buffer to a storage location for subsequent processing (e.g., transcription) and returns to the act 202 to acquire and process additional acoustic signals.

Processes 200, 300, and 500 each depict one particular sequence of acts in a particular example. The acts included in these processes may be performed by, or using, one or more telecommunication devices specially configured as discussed herein. Some acts are optional and, as such, may be omitted in accord with one or more examples. Additionally, the order of acts can be altered, or other acts can be added, without departing from the scope of the systems and methods discussed herein.

Example System

Figure 6:
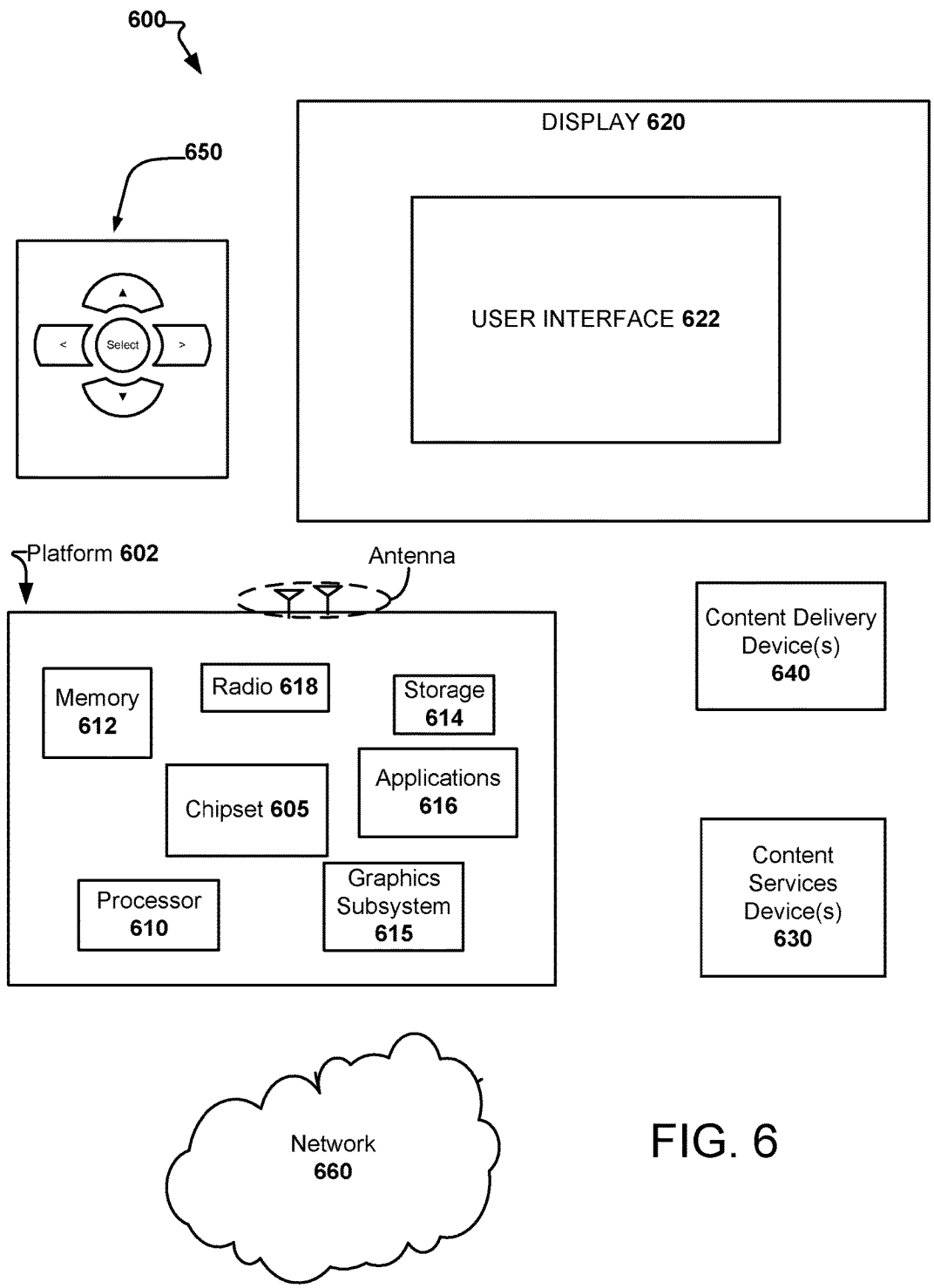
FIG. 6 illustrates a telecommunications system configured in accordance with an embodiment of the present disclosure.

FIG. 6 illustrates a computer system 600 configured in accordance with an embodiment of the present disclosure. In some embodiments, system 600 may be a communications or telecommunications device, such as any of the telecommunications devices 106A through 106N or the audio processing device 400 although system 600 is not limited to these contexts. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations and displaying content.

In some embodiments, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact with, for example, platform 602 and/or display 620, so as to supplement navigational gesturing by the user. Each of these example components is described in more detail below.

In some embodiments, platform 602 may comprise any combination of a chipset 605, processor 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 610 may comprise dual-core processor(s), dual-core mobile processor(s), and so forth. Memory 612 may be implemented, for instance, as a volatile memory device such as, but not limited to, a Random Access Memory (RAM), Dynamic Random Access Memory (DRAM), or Static RAM (SRAM). Storage 614 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 614 may comprise technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605. The graphics and/or video processing techniques may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 618 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In some embodiments, display 620 may comprise any television or computer type monitor or display. Under the control of one or more software applications 616, platform 602 may display a user interface 622 on display 620.

In some embodiments, content services device(s) 630 may be hosted by any national, international and/or independent service and thus accessible to platform 602 via the Internet or other network, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620. In some embodiments, content services device(s) 630 may comprise a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, graphics, text, medical and gaming content, and so forth.

Content services device(s) 630 receives content such as cable television programming including media information, digital information, and/or other content. Examples of content providers may include any cable or satellite television or radio or Internet content providers. The provided examples are not meant to limit the present disclosure. In some embodiments, platform 602 may receive control signals from navigation controller 650 having one or more navigation features. The navigation features of controller 650 may be used to interact with user interface 622, for example. In some embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 650 may be echoed on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In some embodiments, controller 650 may not be a separate component but integrated into platform 602 and/or display 620. Embodiments, however, are not limited to the elements or in the context shown or described herein, as will be appreciated.

In some embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off." In addition, chipset 605 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, image, video, text and so forth. Control information may refer to any data representing commands, instructions or control words meant for an automated system. For example, control information may be used to route media information through a system, or instruct a node to process the media information in a predetermined manner. The embodiments, however, are not limited to the elements or context shown or described in FIG. 6.

Figure 7:
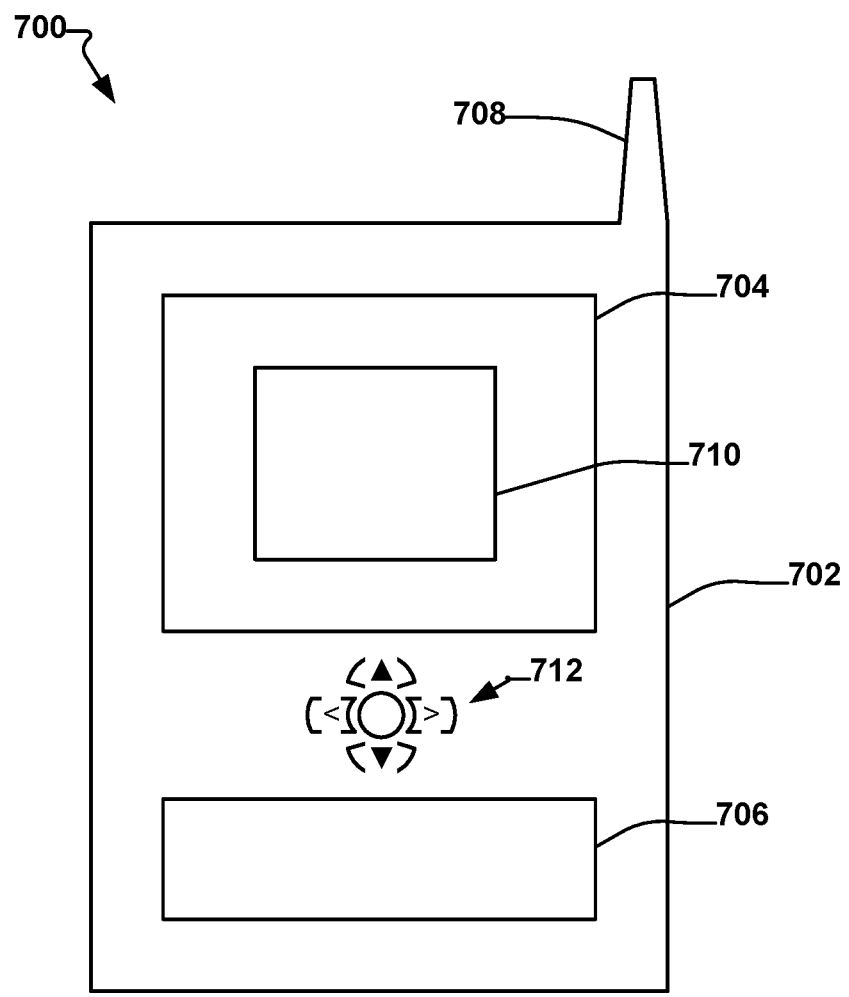
FIG. 7 illustrates a mobile computing system configured in accordance with an embodiment of the present disclosure.

As described above, system 600 may be embodied in varying physical styles or form factors. FIG. 7 illustrates embodiments of a small form factor device 700 in which system 600 may be embodied. In some embodiments, for example, device 700 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may comprise a housing 702, a display 704, an input/output (I/O) device 706, and an antenna 708. Device 700 also may comprise navigation features 712. Display 704 may comprise any suitable display unit for displaying information appropriate for a mobile computing device, such as user interface 710. I/O device 706 may comprise any suitable I/O device for entering information into a mobile computing device. Examples for I/O device 706 may include an alphanumeric keyboard, a numeric keypad, a touch pad, input keys, buttons, a camera, switches, rocker switches, microphones, speakers, voice recognition device and software, and so forth. Information also may be entered into device 700 by way of microphone. Such information may be digitized by a voice recognition device, such as the ASR component 116 described above with reference to FIGS. 1 and 4. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a non-transitory machine-readable medium or article or computer program product which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Further Example Embodiments

The following examples pertain to further embodiments, from which numerous permutations and configurations will be apparent.

Example 1 is a telecommunications device comprising a memory; a network interface; a microphone; and at least one processor coupled to the memory, the network interface, and the microphone. The at least one processor is configured to acquire, via the microphone, an acoustic signal representative of ambient sound; generate acoustic data representative of the acoustic signal; identify at least one speech command within the acoustic data; mask the at least one speech command within the acoustic data to generate masked acoustic data; and transmit the masked acoustic data to another telecommunications device.

Example 2 includes the subject matter of Example 1, wherein the at least one processor is configured to identify the at least one speech command at least in part by identifying at least one command delimiter within the acoustic data.

Example 3 includes the subject matter of either Example 1 or Example 2, wherein the at least one processor is configured to mask the at least one speech command at least in part by deleting the at least one speech command from the acoustic data.

Example 4 includes the subject matter of any of Examples 1-3, wherein the at least one processor is configured to mask the at least one speech command at least in part by overwriting the at least one speech command from the acoustic data with different acoustic data.

Example 5 includes the subject matter of Example 4, wherein the different acoustic data includes at least one of noise, silence, and a tone.

Example 6 includes the subject matter of any of Examples 1-5, wherein the acoustic data comprises a command indicator and the at least one processor is configured to identify the command indicator; store the command indicator within an audio buffer; store additional acoustic data subsequent to the command indicator in the audio buffer; determine that a concatenation of the command indicator and the additional acoustic data is not a part of an executable speech command sequence; modify the concatenation to increase its audio rate; and transmit the modified concatenation to at least one other telecommunications device.

Example 7 includes the subject matter of Example 6, wherein the at least one processor is configured to modify the concatenation at least in part by down sampling the concatenation to decrease its duration when rendered.

Example 8 is a method of masking speech commands using a telecommunication device. The method comprises acquiring an acoustic signal representative of ambient sound; generating acoustic data representative of the acoustic signal; identifying at least one speech command within the acoustic data; masking the at least one speech command within the acoustic data to generate masked acoustic data; and transmitting the masked acoustic data to another telecommunications device.

Example 9 includes the subject matter of Example 8, wherein identifying the at least one speech command comprises identifying at least one command delimiter within the acoustic data.

Example 10 includes the subject matter of either Example 8 or Example 9, wherein masking the at least one speech command comprises deleting the at least one speech command from the acoustic data.

Example 11 includes the subject matter of any of Examples 8-10, wherein masking the at least one speech command comprises overwriting the at least one speech command from the acoustic data with different acoustic data.

Example 12 includes the subject matter of Example 11, wherein overwriting the at least one speech command includes storing acoustic data renderable as at least one of noise, silence, and a tone.

Example 13 includes the subject matter of any of Examples 8-12, further comprising identifying a command indicator included in the acoustic data; storing the command indicator within an audio buffer; storing additional acoustic data subsequent to the command indicator in the audio buffer; determining that a concatenation of the command indicator and the additional acoustic data is not a part of an executable speech command sequence; modifying the concatenation to increase its audio rate; and transmitting the modified concatenation to at least one other telecommunications device.

Example 14 includes the subject matter of Example 13, wherein modifying the acoustic data comprises down sampling the acoustic data to decrease its duration when rendered.

Example 15 is a non-transient computer readable medium encoded with instructions that when executed by one or more processors cause a process for masking speech commands using a telecommunication device to be carried out. The process comprises acquiring an acoustic signal representative of ambient sound; generating acoustic data representative of the acoustic signal; identifying at least one speech command within the acoustic data; masking the at least one speech command within the acoustic data to generate masked acoustic data; and transmitting the masked acoustic data to another telecommunications device.

Example 16 includes the subject matter of Example 15, wherein identifying the at least one speech command comprises identifying at least one command delimiter within the acoustic data.

Example 17 includes the subject matter of either Example 15 or Example 16, wherein masking the at least one speech command comprises deleting the at least one speech command from the acoustic data.

Example 18 includes the subject matter of any of Examples 15-17, wherein masking the at least one speech command comprises overwriting the at least one speech command from the acoustic data with different acoustic data.

Example 19 includes the subject matter of Example 18, wherein overwriting the at least one speech command includes storing acoustic data renderable as at least one of noise, silence, and a tone.

Example 20 includes the subject matter of any of Examples 15-19, the process further comprising identifying a command indicator included in the acoustic data; storing the command indicator within an audio buffer; storing additional acoustic data subsequent to the command indicator in the audio buffer; determining that a concatenation of the command indicator and the additional acoustic data is not a part of an executable speech command sequence; modifying the concatenation to increase its audio rate; and transmitting the modified concatenation to at least one other telecommunications device.

Example 21 includes the subject matter of Example 20, wherein modifying the acoustic data comprises down sampling the acoustic data to decrease its duration when rendered.

Example 22 is directed to an audio processing device including a memory; a microphone; and at least one processor coupled to the memory and the microphone. The at least one processor is configured to acquire, via the microphone, an acoustic signal representative of ambient sound; generate acoustic data representative of the acoustic signal; identify at least one speech command within the acoustic data; mask the at least one speech command within the acoustic data to generate masked acoustic data; and store the masked acoustic data in the memory.

Example 23 includes the subject matter of Example 22, wherein the at least one processor is configured to identify the at least one speech command at least in part by identifying at least one command delimiter within the acoustic data.

Example 24 is a method of masking speech commands using an audio processing device comprising a memory. The method comprises acquiring an acoustic signal representative of ambient sound; generating acoustic data representative of the acoustic signal; identifying at least one speech command within the acoustic data; masking the at least one speech command within the acoustic data to generate masked acoustic data; and storing the masked acoustic data in the memory.

Example 25 includes the subject matter of Examples 24, further comprising identifying a command indicator included in the acoustic data; storing the command indicator within an audio buffer; storing additional acoustic data subsequent to the command indicator in the audio buffer; determining that a concatenation of the command indicator and the additional acoustic data is not a part of an executable speech command sequence; modifying the concatenation to increase its audio rate; and storing the modified concatenation in the memory.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

The invention claimed is:

1. A telecommunications device comprising:
   a memory;
   a network interface;
   a microphone; and
   at least one processor coupled to the memory, the network interface, and the microphone and configured to:
   acquire, via the microphone, an acoustic signal representative of ambient sound;
   generate acoustic data representative of the acoustic signal;
   identify at least one speech command within the acoustic data;
   mask the at least one speech command within the acoustic data to generate masked acoustic data, such that the at least one speech command can no longer be detected in the masked acoustic data;
   transmit the masked acoustic data to another telecommunications device;
   identify at least one command indicator within the acoustic data;
   store the command indicator within an audio buffer;
   store additional acoustic data subsequent to the command indicator in the audio buffer;
   determine that a concatenation of the command indicator and the additional acoustic data is not a part of an executable speech command sequence;
   in response to the determination, modify the concatenation to increase its audio rate; and
   transmit the modified concatenation to at least one other telecommunications device.

2. The telecommunications device of claim 1, wherein the at least one processor is configured to identify the at least one speech command at least in part by identifying at least one command delimiter within the acoustic data.

3. The telecommunication device of claim 1, wherein the at least one processor is configured to mask the at least one speech command at least in part by deleting the at least one speech command from the acoustic data.

4. The telecommunication device of claim 1, wherein the at least one processor is configured to mask the at least one speech command at least in part by overwriting the at least one speech command from the acoustic data with different acoustic data.

5. The telecommunication device of claim 4, wherein the different acoustic data includes at least one of noise, silence, and a tone.

6. The telecommunications device of claim 1, wherein the at least one processor is configured to modify the concatenation at least in part by down sampling the concatenation to decrease its duration when rendered.

7. A method of using a telecommunication device, the method comprising:
   acquiring an acoustic signal representative of ambient sound;
   generating acoustic data representative of the acoustic signal;
   identifying at least one speech command within the acoustic data;
   masking the at least one speech command within the acoustic data to generate masked acoustic data, such that the at least one speech command can no longer be detected in the masked acoustic data;

transmitting the masked acoustic data to another telecommunications device;
identifying a command indicator included in the acoustic data;
storing the command indicator within an audio buffer;
storing additional acoustic data subsequent to the command indicator in the audio buffer;
determining that a concatenation of the command indicator and the additional acoustic data is not a part of an executable speech command sequence;
in response to the determination, modifying the concatenation to increase its audio rate; and
transmitting the modified concatenation to at least one other telecommunications device.

8. The method of claim 7, wherein identifying the at least one speech command comprises identifying at least one command delimiter within the acoustic data.

9. The method of claim 7, wherein masking the at least one speech command comprises deleting the at least one speech command from the acoustic data.

10. The method of claim 7, wherein masking the at least one speech command comprises overwriting the at least one speech command from the acoustic data with different acoustic data.

11. The method of claim 10, wherein overwriting the at least one speech command includes storing acoustic data renderable as at least one of noise, silence, and a tone.

12. The method of claim 7, wherein modifying the acoustic data comprises down sampling the acoustic data to decrease its duration when rendered.

13. A non-transient computer readable medium encoded with instructions that when executed by one or more processors cause a process using a telecommunication device to be carried out, the process comprising:
acquiring an acoustic signal representative of ambient sound;
generating acoustic data representative of the acoustic signal;
identifying at least one speech command within the acoustic data;
masking the at least one speech command within the acoustic data to generate masked acoustic data, such that the at least one speech command can no longer be detected in the masked acoustic data;
transmitting the masked acoustic data to another telecommunications device;
identifying a command indicator included in the acoustic data;
storing the command indicator within an audio buffer;
storing additional acoustic data subsequent to the command indicator in the audio buffer;
determining that a concatenation of the command indicator and the additional acoustic data is not a part of an executable speech command sequence;
in response to the determination, modifying the concatenation to increase its audio rate; and
transmitting the modified concatenation to at least one other telecommunications device.

14. The computer readable medium of claim 13, wherein identifying the at least one speech command comprises identifying at least one command delimiter within the acoustic data.

15. The computer readable medium of claim 13, wherein masking the at least one speech command comprises deleting the at least one speech command from the acoustic data.

16. The computer readable medium of claim 13, wherein masking the at least one speech command comprises overwriting the at least one speech command from the acoustic data with different acoustic data.

17. The computer readable medium of claim 16, wherein overwriting the at least one speech command includes storing acoustic data renderable as at least one of noise, silence, and a tone.

18. The computer readable medium of claim 13, wherein modifying the acoustic data comprises down sampling the acoustic data to decrease its duration when rendered.

19. An audio processing device comprising:
a memory;
a microphone; and
at least one processor coupled to the memory and the microphone and configured to:
acquire, via the microphone, an acoustic signal representative of ambient sound;
generate acoustic data representative of the acoustic signal;
identify at least one speech command within the acoustic data;
mask the at least one speech command within the acoustic data to generate masked acoustic data, such that the at least one speech command can no longer be detected in the masked acoustic data;
store the masked acoustic data in the memory;
identify a command indicator within the acoustic data;
store the command indicator within an audio buffer;
store additional acoustic data subsequent to the command indicator in the audio buffer;
determine that a concatenation of the command indicator and the additional acoustic data is not a part of an executable speech command sequence;
in response to the determination, modify the concatenation to increase its audio rate; and
store the modified concatenation in the memory.

20. A method of masking speech commands using an audio processing device comprising a memory, the method comprising:
acquiring an acoustic signal representative of ambient sound;
generating acoustic data representative of the acoustic signal;
identifying at least one speech command within the acoustic data;
masking the at least one speech command within the acoustic data to generate masked acoustic data, such that the at least one speech command can no longer be detected in the masked acoustic data;
storing the masked acoustic data in the memory;
identifying a command indicator included in the acoustic data;
storing the command indicator within an audio buffer;
storing additional acoustic data subsequent to the command indicator in the audio buffer;
determining that a concatenation of the command indicator and the additional acoustic data is not a part of an executable speech command sequence;
in response to the determination, modifying the concatenation to increase its audio rate; and
storing the modified concatenation in the memory.

* * * * *